US011055396B2

(12) United States Patent
Gross et al.

(10) Patent No.: US 11,055,396 B2
(45) Date of Patent: *Jul. 6, 2021

(54) DETECTING UNWANTED COMPONENTS IN A CRITICAL ASSET BASED ON EMI FINGERPRINTS GENERATED WITH A SINUSOIDAL LOAD

(71) Applicant: Oracle International Corporation, Redwood Shores, CA (US)

(72) Inventors: Kenny C. Gross, Escondido, CA (US); Michael H. S. Dayringer, Union City, CA (US); Andrew J. Lewis, Litchfield, NH (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 16/506,803

(22) Filed: Jul. 9, 2019

(65) Prior Publication Data

US 2021/0011990 A1    Jan. 14, 2021

(51) Int. Cl.
*G06F 21/44* (2013.01)
*G06F 21/76* (2013.01)

(52) U.S. Cl.
CPC .............. *G06F 21/44* (2013.01); *G06F 21/76* (2013.01)

(58) Field of Classification Search
CPC . H04L 29/06; H04L 25/40; H04L 7/08; H04L 7/00; G06F 21/44; G06F 11/30; G06F 21/56; G06F 17/50; G06F 15/00; G06F 21/76; G06F 21/577; G08B 29/00; H03D 3/24; H03D 3/00; H03L 7/00; H03K 5/135; H04J 3/06; H04B 14/02

See application file for complete search history.

(56) References Cited

U.S. PATENT DOCUMENTS

| | | | |
|---|---|---|---|
| 6,577,691 B2 * | 6/2003 | Richards | ................. G01S 7/282 375/355 |
| 7,613,580 B2 | 11/2009 | Gross et al. | |
| 8,069,490 B2 | 11/2011 | Gross et al. | |
| 8,200,991 B2 | 6/2012 | Vaidyanathan et al. | |
| 8,457,913 B2 * | 6/2013 | Zwinger | ............. G01R 31/2884 702/77 |
| 9,455,981 B2 * | 9/2016 | Troyansky | .......... G06F 21/6218 |
| 10,396,990 B2 * | 8/2019 | Hart | ........................ G06F 21/44 |

* cited by examiner

*Primary Examiner* — Thanhnga B Truong
(74) *Attorney, Agent, or Firm* — Park, Vaughan, Fleming & Dowler LLP (57) ABSTRACT

The disclosed embodiments provide a system that detects unwanted electronic components in a target asset. During operation, the system generates a sinusoidal load for the target asset. Next, the system obtains target electromagnetic interference (EMI) signals by monitoring EMI signals generated by the target asset while the target asset is executing the sinusoidal load. The system then generates a target EMI fingerprint from the target EMI signals. Finally, the system compares the target EMI fingerprint against a reference EMI fingerprint for the target asset to determine whether the target asset contains unwanted electronic components.

20 Claims, 8 Drawing Sheets

DETECTING UNWANTED COMPONENTS IN A CRITICAL ASSET BASED ON EMI FINGERPRINTS GENERATED WITH A SINUSOIDAL LOAD

BACKGROUND

Field

The disclosed embodiments generally relate to techniques for detecting unwanted electronic components in critical assets, such as utility system components or computer servers. More specifically, the disclosed embodiments relate to a technique that detects unwanted electronic components, such as spy chips, mod chips or counterfeit electronic components, in critical assets based on electromagnetic interference (EMI) fingerprints generated with a sinusoidal load.

Related Art

Unwanted electronic components, such as spy chips, mod chips or counterfeit components, are causing problems in critical assets, such as utility system components and computer servers. For example, bad actors will sometimes piggyback a "spy chip" onto a regular chip, or wire a "mod chip" onto a motherboard of a critical asset to facilitate eavesdropping on operations of the critical asset. Counterfeit components also create problems because they often perform poorly, or fail within a short period of time.

Techniques have been developed to detect such unwanted components in enterprise computing systems based on electro-magnetic interference (EMI) fingerprints, which are analyzed using prognostic-surveillance techniques. (For example, see U.S. Pat. No. 8,069,480, entitled "Detecting Counterfeit Electronic Components Using EMI Telemetric Fingerprints" by inventors Kenny C. Gross, et al., filed 16 Oct. 2007.)

The above-described technique operates by training an inferential model to detect EMI signals emanating from a critical asset, which are not consistent with normal operation of the critical asset. During this training process, it is undesirable to simply power-on the critical asset and let it sit idle. This is because the EMI signals emanating from an idle asset tend to be comprised of stationary random noise. If the characteristic signature of the unwanted component is small and "within the noise band" of the asset being scanned, and all signals are stationary while the asset is sitting idle, then it could be very hard or mathematically intractable to detect the small characteristic signature because it is buried in the much larger random stationary signature of the asset itself.

Hence, what is needed is a technique for detecting unwanted electronic components in critical assets without the above-described limitations of existing techniques.

SUMMARY

The disclosed embodiments provide a system that detects unwanted electronic components in a target asset. During operation, the system generates a sinusoidal load for the target asset. Next, the system obtains target electromagnetic interference (EMI) signals by monitoring EMI signals generated by the target asset while the target asset is executing the sinusoidal load. The system then generates a target EMI fingerprint from the target EMI signals. Finally, the system compares the target EMI fingerprint against a reference EMI fingerprint for the target asset to determine whether the target asset contains unwanted electronic components.

In some embodiments, the system also verifies its own operability. During this verification process, the system obtains target EMI signals generated by the target asset while the target asset is executing the sinusoidal load. Next, the system computes a cross power spectral density (CPSD) between the sinusoidal load and the target EMI signals. The system then extracts spikes from an output of the CPSD. If a frequency of an extracted spike matches a frequency of a source spike from the sinusoidal load, the system computes a ratio between the height of the extracted spike and the height of the source spike from the sinusoidal load. If the ratio exceeds an operability threshold, the system verifies its own operability. If the ratio does not meet the operability threshold, the system generates a warning to check an antenna and associated circuitry used to obtain the target EMI signals.

In some embodiments, while generating the sinusoidal load, the system uses a pulse-width-modulation technique that sinusoidally modulates a duty cycle of a load, which cycles between an on-state and an off-state, to generate the sinusoidal load.

In some embodiments, while generating the target EMI fingerprint from the target EMI signals, the system performs a target Fast Fourier Transform (FFT) operation on the target EMI signals to transform the target EMI signals from a time-domain representation to a frequency-domain representation. Next, the system partitions an output of the target FFT operation into a set of frequency bins. The system then constructs a target amplitude time-series signal for each of the frequency bins in the set of frequency bins, and selects a subset of frequency bins that are associated with the highest average correlation coefficients. Finally, the system generates the target EMI fingerprint by combining target amplitude time-series signals for each of the selected subset of frequency bins.

In some embodiments, while selecting the subset of frequency bins, the system first computes cross-correlations between pairs of amplitude time-series signals associated with pairs of the set of frequency bins. Next, the system computes an average correlation coefficient for each of the frequency bins. The system then selects a subset of frequency bins that are associated with the highest average correlation coefficients.

In some embodiments, prior to obtaining the target EMI signals, the system generates the reference EMI fingerprint. During this process, the system obtains reference EMI signals, which are generated by a reference asset of the same type as the target asset while the reference asset is executing the sinusoidal load, wherein the reference asset is certified not to contain unwanted electronic components. The system then generates the reference EMI fingerprint from the reference EMI signals.

In some embodiments, the system trains a multivariate state estimation technique (MSET) model using the reference amplitude time-series signals for the reference EMI fingerprint.

In some embodiments, while comparing the target EMI fingerprint against the reference EMI fingerprint, the system feeds the target amplitude time-series signals into the trained MSET model to produce estimated values for the target amplitude time-series signals. Next, the system performs pairwise-differencing operations between actual values and the estimated values for the amplitude time-series signals to produce residuals. The system then performs a sequential probability ratio test (SPRT) on the residuals to produce SPRT alarms. Finally, the system determines from the SPRT alarms whether the target asset contains any unwanted electronic components.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, while training an inferential model to detect unwanted electrical components, it is undesirable to simply power-on the critical asset and let it sit idle. This is because EMI signals emanating from an idle asset tend to be comprised of stationary random noise. Hence, if the characteristic signature of the unwanted component is small and "within the noise band" of the asset being scanned, it will be hard if not impossible to detect the unwanted component.

It is preferable to introduce a deterministic dynamic variation in workload for the asset, both during the training process and the detection process. With this dynamic workload, the inferential model can learn patterns of correlation among the multiple signals that comprise the EMI fingerprints. The trained inferential model can then be used to monitor suspect assets running the same deterministic dynamic workload. Hence, the inferential model works better for a dynamic workload and can more easily detect unwanted electrical components, which have signatures that are within the noise band of the asset being tested.

A dynamic workload can be achieved by simply turning a system from on to off or moving a system between low and high workloads. However, inferential models provide greater discrimination if we program the asset to exhibit additional dynamics, for example by cycling between low and high for a few sequences. It is even better if the deterministic pattern can be shaped to trace out a sinusoid.

A sinusoidal load is preferable for the same reasons that sinusoidal impulsion techniques have been used for decades to assess mechanical assets: if a mechanical system is given a sinusoidal stimulus, then mechanical response variables, when transformed into the frequency domain with an FFT, will produce a sharp "spike" in the power spectral density at the same frequency of the input sinusoidal stimulus. There also exist a large number of frequency-domain tools that can be used to determine the dynamic characteristics of complex mechanical systems, and can do so with extremely high signal-to-noise ratios in the frequency domain thanks to the sinusoidal stimulus.

Moreover, a sinusoidal load that continuously cycles between minimum (e.g., idle) and maximum leaves no "gaps" or "blind spots" in the dynamic signatures of monitored variables. Hence, a sinusoidal load imparts maximum information content for learning correlations among multiple monitored signals. Also, by using a sinusoidal load, we can gain tremendous economy in testing time by going into the frequency domain and leveraging extremely efficient frequency domain characteristics, for example that the power spectral density (PSD) of a digitized time series with one or more periodic components yields very sharp deterministic spikes for each periodicity.

To capture these advantages in the new training/testing procedure, we have adapted a sinusoidal virtual-pulse-width-modulation (VPWM) technique that was previously developed for the narrow use case of energy-use characterization for computing servers. (See U.S. Pat. No. 8,200,991, entitled "Method for Sinusoidal Power Profile Generation in Computer Systems," by inventors K. Vaidyanathan and K. C. Gross, filed 9 May 2008.)

Also note that many critical assets, such as power system assets, are presently controlled via an electronic interface, such as a firmware-controlled API, and it is very uncommon to have continuously variable load-control for such assets. Note that our technique will work with a continuously variable load-control to generate a sinusoidal workload. However, by using VPWM, our technique can also be applied to the more common use cases wherein the asset only has two performance levels (e.g. on/off, high/low, active/idle, etc.), or a small number of performance settings (e.g., three speed settings, or a small number of discrete settings). The VPWM technique can be used to produce a smooth and continuous sinusoidal load profile, which yields extremely short test-scan times, and provides ultra-low numbers of false-alarms and/or missed-alarms for detection of unwanted components.

A sinusoidal workload also makes it possible for a testing system to verify its own operability by analyzing time-series signals from the critical asset to detect and determine the magnitude of a spike in the frequency domain that matches a frequency of the sinusoidal load. This operability verification process is described in more detail below.

These above-described characteristics make it possible to use our new technique to detect unwanted components in critical assets at various checkpoints in a supply chain. For example, the new technique can be used at ports of entry when electronic systems are transported across borders to get to assembly plants, and when assembled systems are transported across borders for global distribution.

Before describing our new technique further, we first describe an exemplary unwanted-component detection system in which it operates.

Unwanted-Component Detection System

Figure 1:
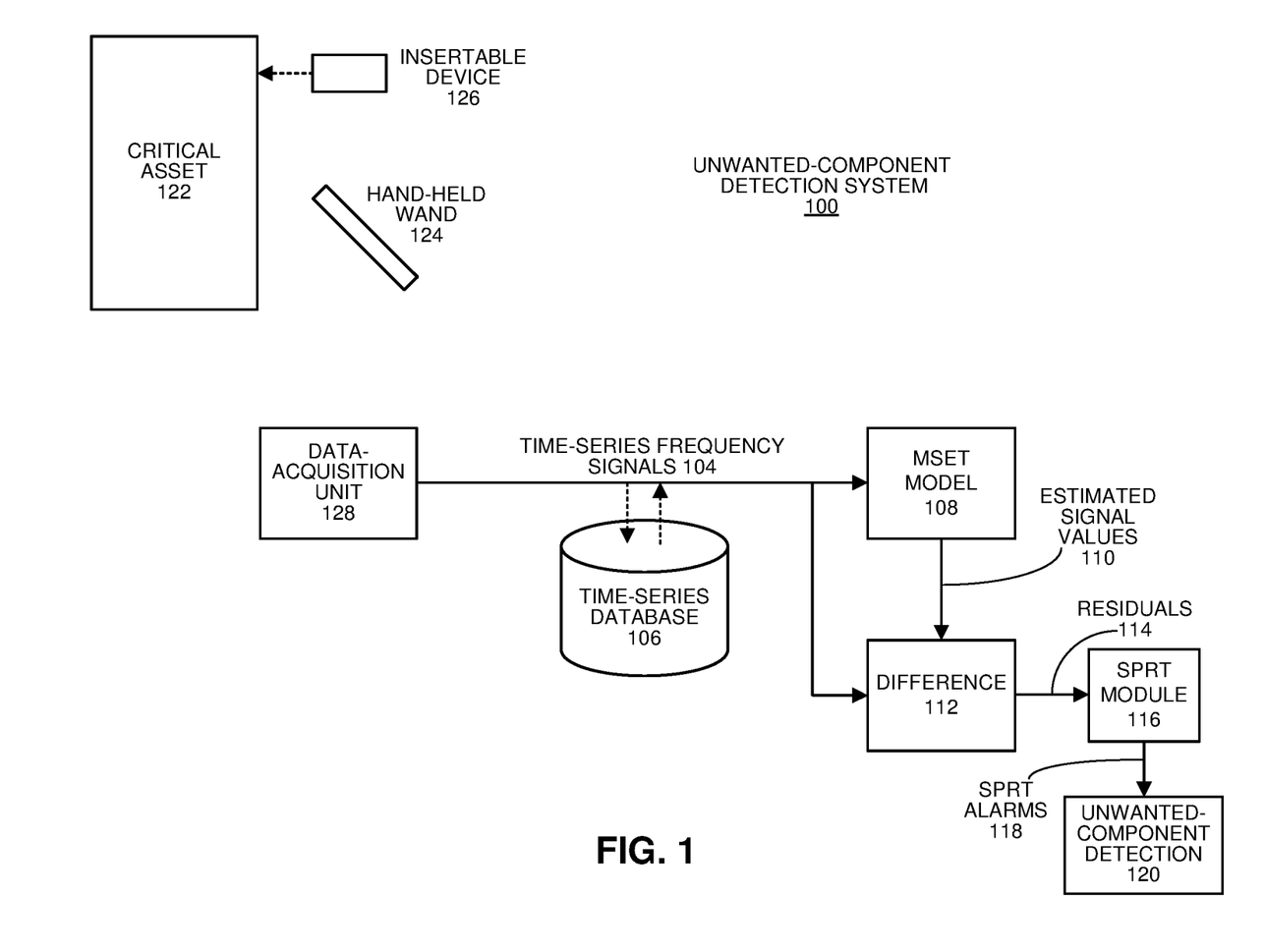
FIG. 1 illustrates an unwanted-component detection system in accordance with the disclosed embodiments.

FIG. 1 illustrates an exemplary unwanted-component detection system 100 in accordance with the disclosed embodiments. As illustrated in FIG. 1, unwanted-component detection system 100 gathers EMI signals from a critical asset 122. Critical asset 122 can generally include any type of system that includes electrical components, such as a component in a utility electrical distribution system, a computer server, or a machine in a factory.

Moreover, this EMI-signal-gathering process can involve a number of possible EMI-signal-acquisition devices, including a hand-held wand 124 and an insertable device 126. Handheld wand 124 can generally include any type of handheld device that is capable of gathering EMI emissions from critical asset 122 (for example through an antenna), and transmitting associated EMI signals to data-acquisition unit 128. Insertable device 126 can generally include any type of device that can be inserted into critical asset 122 to gather EMI signals. For example, insertable device 126 can include: a PCI card, which is insertable into a PCI slot in the target computing system; an HDD filler package, which is insertable into an HDD slot in the target computing system; or a USB dongle, which is insertable into a USB port in the target computing system. When insertable device 126 is inserted into critical asset 122, insertable device 126 is electrically coupled to a ground plane or other signal lines of critical asset 122 (or, alternatively, includes a fixed antenna structure, which is optimized for a specific frequency range) to gather EMI signals from critical asset 122. The gathered EMI signals are then communicated to a data-acquisition unit 128.

During operation of unwanted-component detection system 100, time-series frequency signals 104 from data-acquisition unit 128 can feed into a time-series database 106, which stores the time-series frequency signals 104 for subsequent analysis. Then, time-series frequency signals 104 either feed directly from data-acquisition unit 128 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series frequency signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise-differencing operation between the actual signal values and the estimated signal values to produce residuals 114. The system then performs a "detection operation" on the residuals 114 by using SPRT module 116 to detect anomalies and to generate SPRT alarms 118. (For a description of the SPRT model, please see Wald, Abraham, June 1945, "Sequential Tests of Statistical Hypotheses." *Annals of Mathematical Statistics.* 16 (2): 117-186.)

SPRT alarms 118 then feed into an unwanted-component detection module 120, which detects the presence of unwanted components inside critical asset 122 based on the tripping frequencies of SPRT alarms 118.

Process of Detecting Unwanted Components

Figure 2:
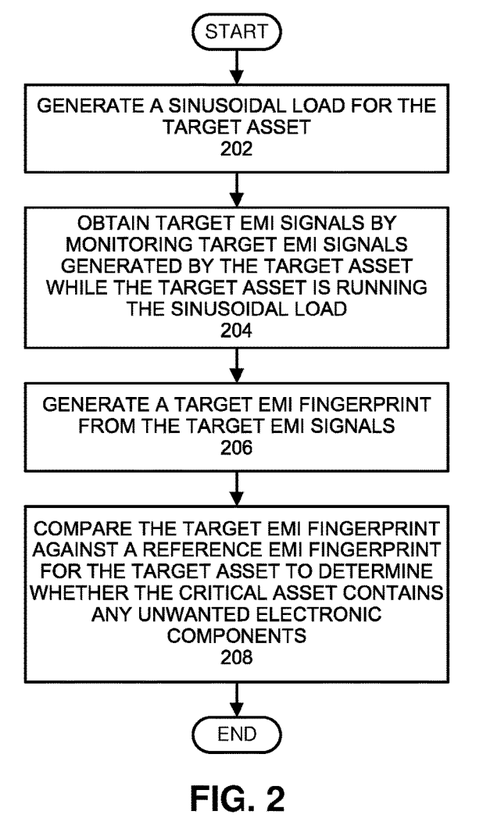
FIG. 2 presents a flow chart illustrating a process for detecting unwanted components in a target asset in accordance with the disclosed embodiments.

FIG. 2 presents a flow chart illustrating a process for detecting unwanted electronic components in a target asset in accordance with the disclosed embodiments. First, the system generates a sinusoidal load for the target asset (step 202). Next, the system obtains target EMI signals by monitoring EMI signals generated by the target asset while the target asset is running the sinusoidal load (step 204). The system then generates a target EMI fingerprint from the target EMI signals (step 206). Finally, the system compares the target EMI fingerprint against a reference EMI fingerprint for the target asset to determine whether the target asset contains unwanted electronic components (step 208).

Figure 3:
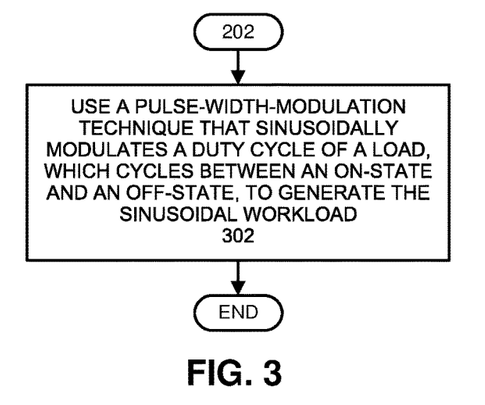
FIG. 3 presents a flow chart illustrating a process for generating a sinusoidal load in accordance with the disclosed embodiments.

FIG. 3 presents a flow chart illustrating a process for generating a sinusoidal load in accordance with the disclosed embodiments. (This flow chart illustrates in more detail the operations performed in step 202 of the flow chart in FIG. 2.) While generating the sinusoidal load, the system uses a pulse-width-modulation technique that sinusoidally modulates a duty cycle of a load, which cycles between an on-state and an off-state, to generate the sinusoidal load (step 302).

Figure 4:
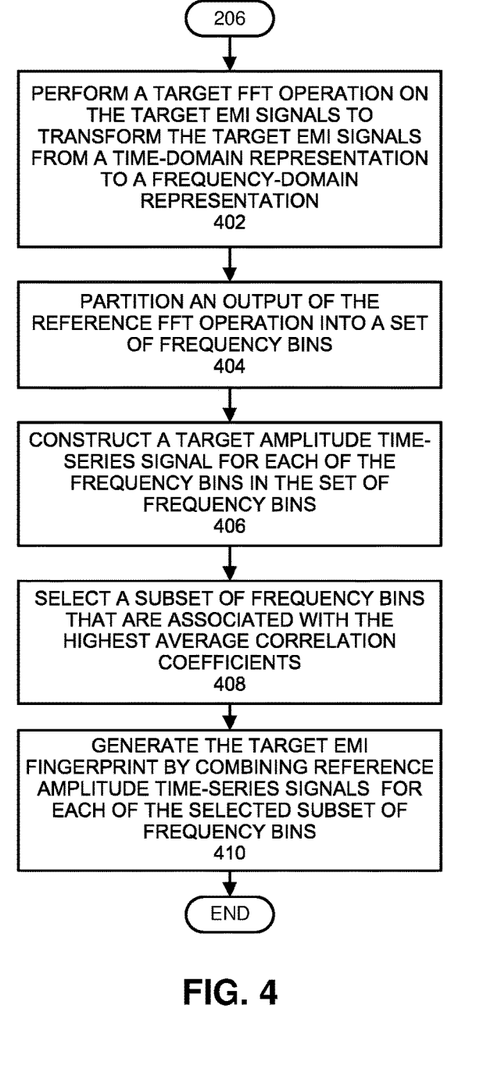
FIG. 4 presents a flow chart illustrating a process for generating a target EMI fingerprint from target EMI signals in accordance with the disclosed embodiments.

FIG. 4 presents a flow chart illustrating a process for generating a target EMI fingerprint from target EMI signals in accordance with the disclosed embodiments. (This flow chart illustrates in more detail the operations performed in step 206 of the flow chart in FIG. 2.) While generating the target EMI fingerprint from the target EMI signals, the system performs a target FFT operation on the target EMI signals to transform the target EMI signals from a time-domain representation to a frequency-domain representation (step 402). Next, the system partitions an output of the target FFT operation into a set of frequency bins (step 404). The system then constructs a target amplitude time-series signal for each of the frequency bins in the set of frequency bins (step 406), and selects a subset of frequency bins that are associated with the highest average correlation coefficients (step 408). Finally, the system generates the target EMI fingerprint by combining target amplitude time-series signals for each of the selected subset of frequency bins (step 410).

Figure 5:
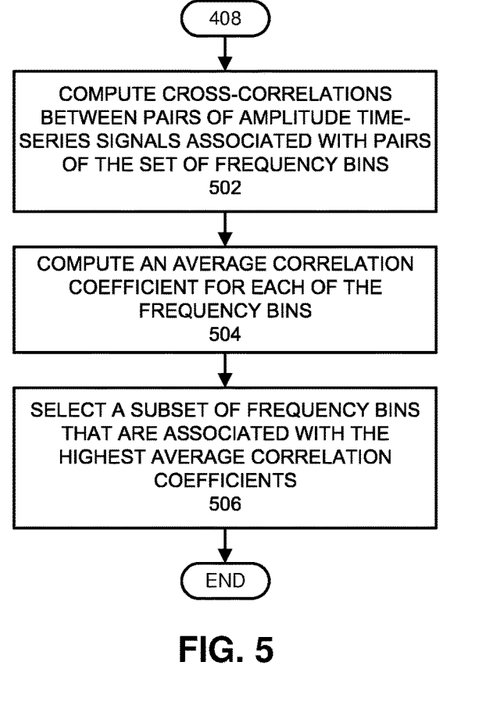
FIG. 5 presents a flow chart illustrating a process for selecting frequency bins with the highest correlation coefficients in accordance with the disclosed embodiments.

FIG. 5 presents a flow chart illustrating a process for selecting frequency bins with the highest correlation coefficients in accordance with the disclosed embodiments. (This flow chart illustrates in more detail the operations performed in step 408 of the flow chart in FIG. 4.) The system first computes cross-correlations between pairs of amplitude time-series signals associated with pairs of the set of frequency bins (step 502). Next, the system computes an average correlation coefficient for each of the frequency bins (step 504). Finally, the system selects a subset of frequency bins that are associated with the highest average correlation coefficients (step 506).

Figure 6:
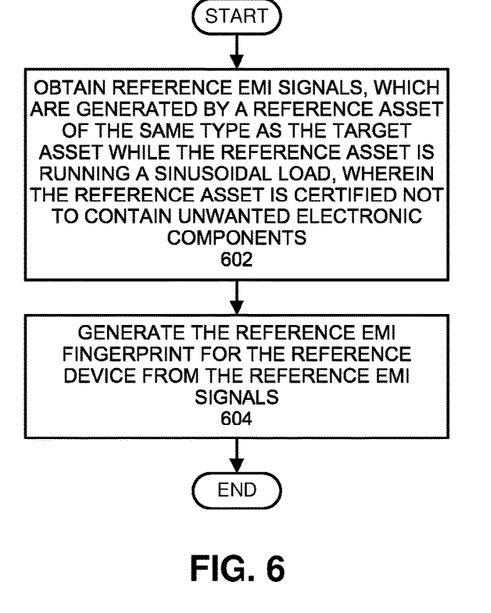
FIG. 6 presents a flow chart illustrating a process for generating a reference EMI fingerprint in accordance with the disclosed embodiments.

FIG. 6 presents a flow chart illustrating a process for generating a reference EMI fingerprint in accordance with the disclosed embodiments. During this process, the system obtains reference EMI signals, which are generated by a reference asset of the same type as the target asset while the reference asset is executing the sinusoidal load, wherein the reference asset is certified not to contain unwanted electronic components (step 602). The system then generates the reference EMI fingerprint from the reference EMI signals (step 604).

Figure 7:
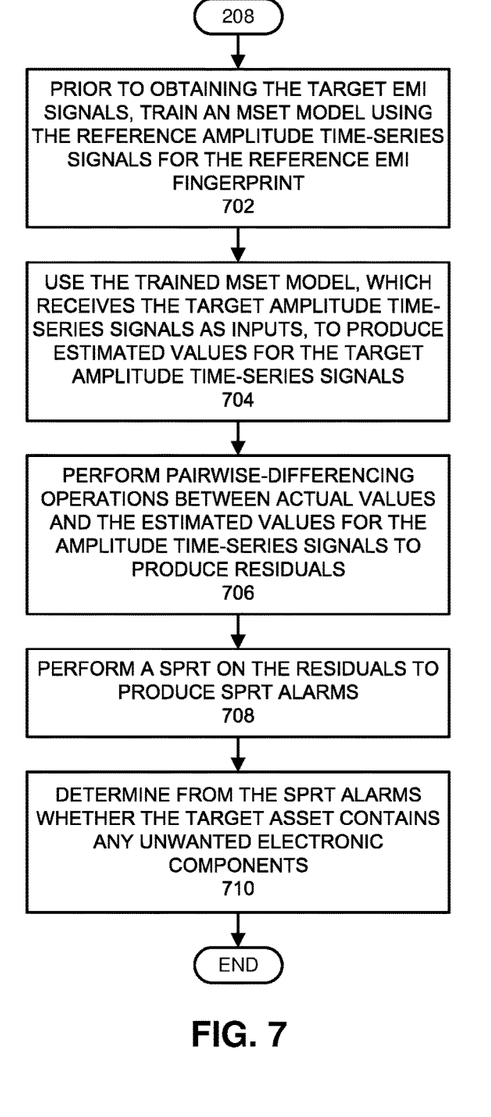
FIG. 7 presents a flow chart illustrating a process for comparing a target EMI fingerprint with a reference EMI fingerprint in accordance with the disclosed embodiments.

FIG. 7 presents a flow chart illustrating a process for comparing a target EMI fingerprint with a reference EMI fingerprint in accordance with the disclosed embodiments. (This flow chart illustrates in more detail the operations performed in step 208 of the flow chart in FIG. 2.) Prior to obtaining the target EMI signals, the system trains an MSET model using the reference amplitude time-series signals for the reference EMI fingerprint (step 702). Next, the system uses the trained MSET model, which receives the target amplitude time-series signals as inputs, to produce estimated values for the target amplitude time-series signals (step 704). The system then performs pairwise-differencing operations between actual values and the estimated values for the amplitude time-series signals to produce residuals (step 706). Next, the system performs a SPRT on the residuals to produce SPRT alarms (step 708). Finally, the system determines from the SPRT alarms whether the target computing system contains any unwanted electronic components (step 710).

Figure 8A:
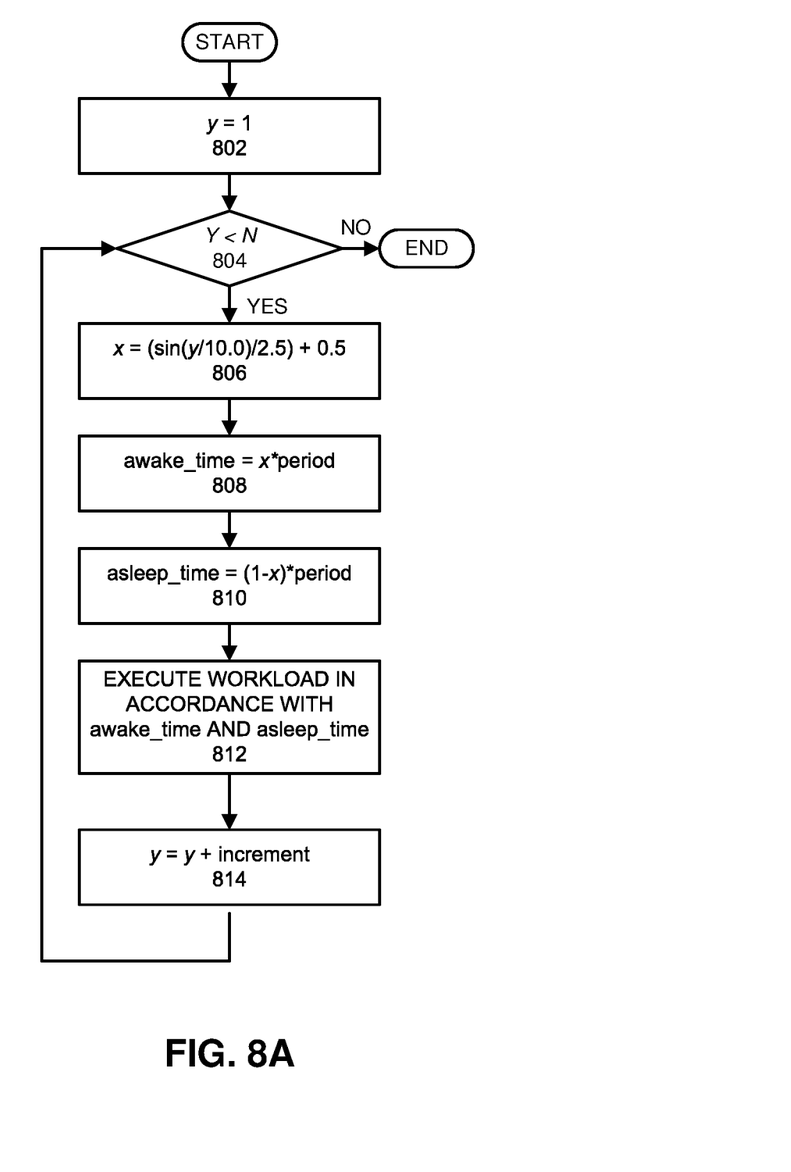
FIG. 8A presents a flow chart for a sinusoidal-load-generation process in accordance with the disclosed embodiments.
Figure 8B:
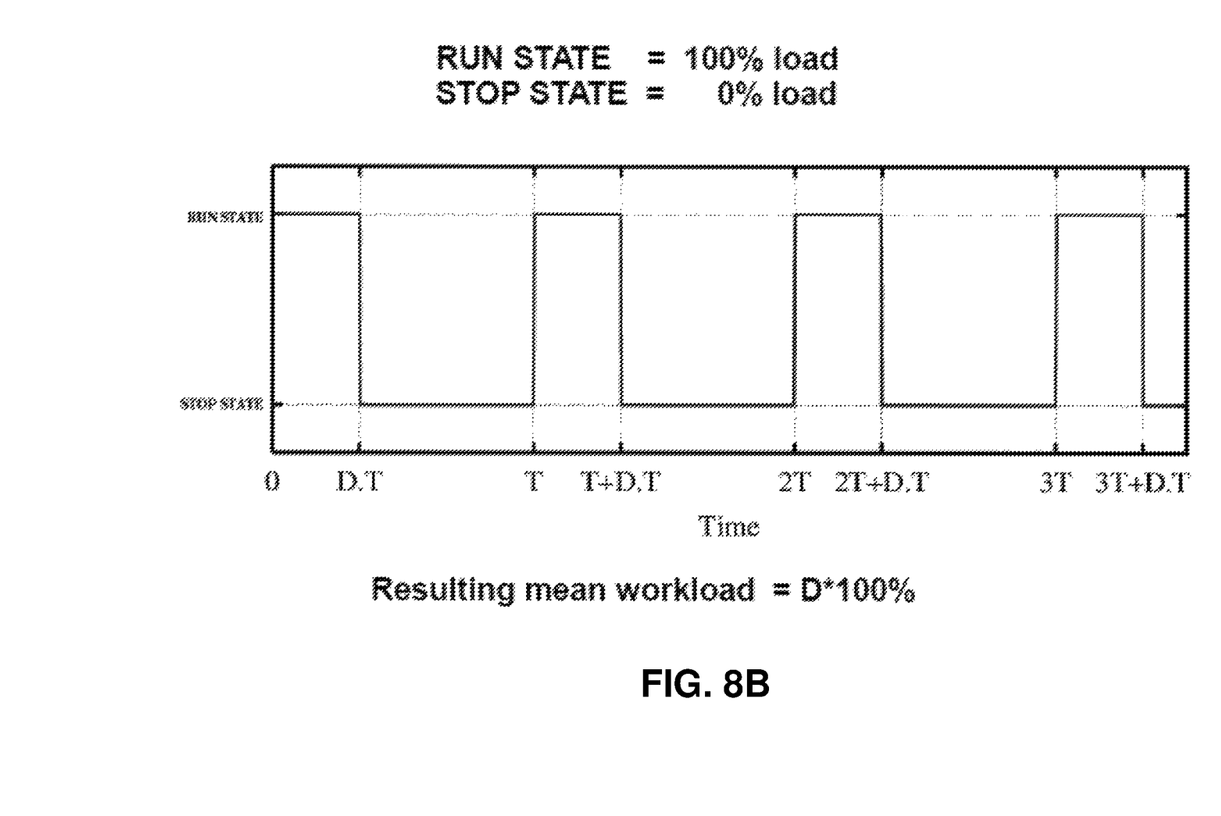
FIG. 8B illustrates duty cycles for the sinusoidal-load-generation process in accordance with the disclosed embodiments.
Figure 8C:
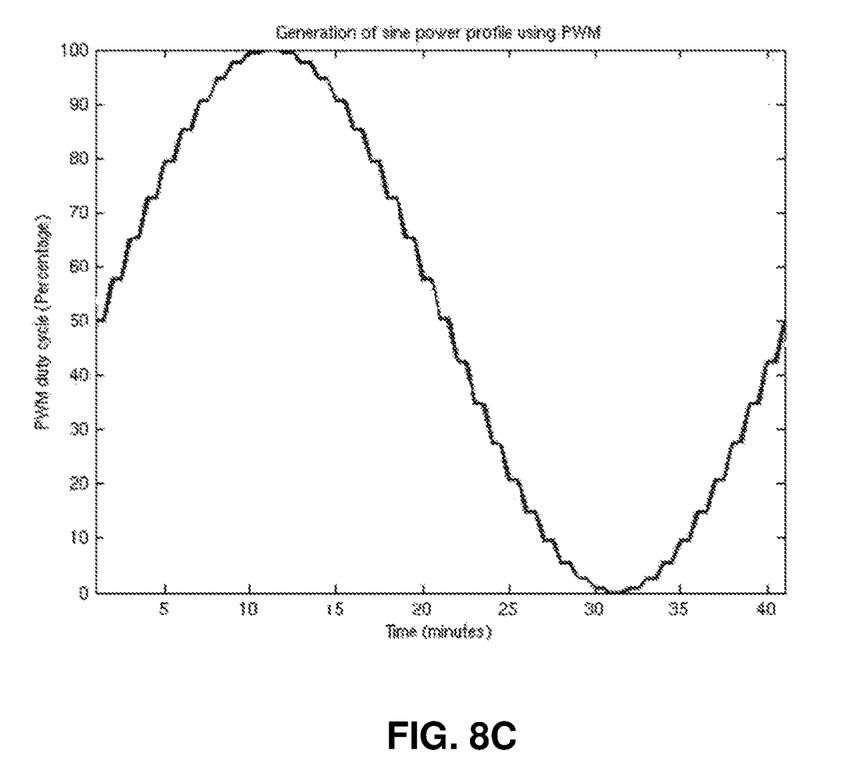
FIG. 8C illustrates a resulting sinusoidal signal in accordance with the disclosed embodiments.

FIG. 8A presents a flow chart for a sinusoidal-load-generation process in accordance with the disclosed embodiments. The process starts by initializing a counter variable y=1 (step 802). Next, the process tests a loop termination condition by determining whether y<N (step 804). If not (NO at step 804), the process is complete. If so (YES at step 804), the process computes a duty cycle x=(sin(y/10.0)/2.5)+0.5 (step 806). The process then computes an awake_time=x*period (step 808) and an asleep_time=(1−x)*period (step 810). Next, the process executes a load in accordance with awake_time and asleep_time (step 812). The system then increments the counter variable y=y+ increment (step 814) and returns to step 804. FIG. 8B illustrates resulting duty cycles for the sinusoidal-load-generation process illustrated in FIG. 8A, and FIG. 8C illustrates a resulting sinusoidal signal.

Figure 9:
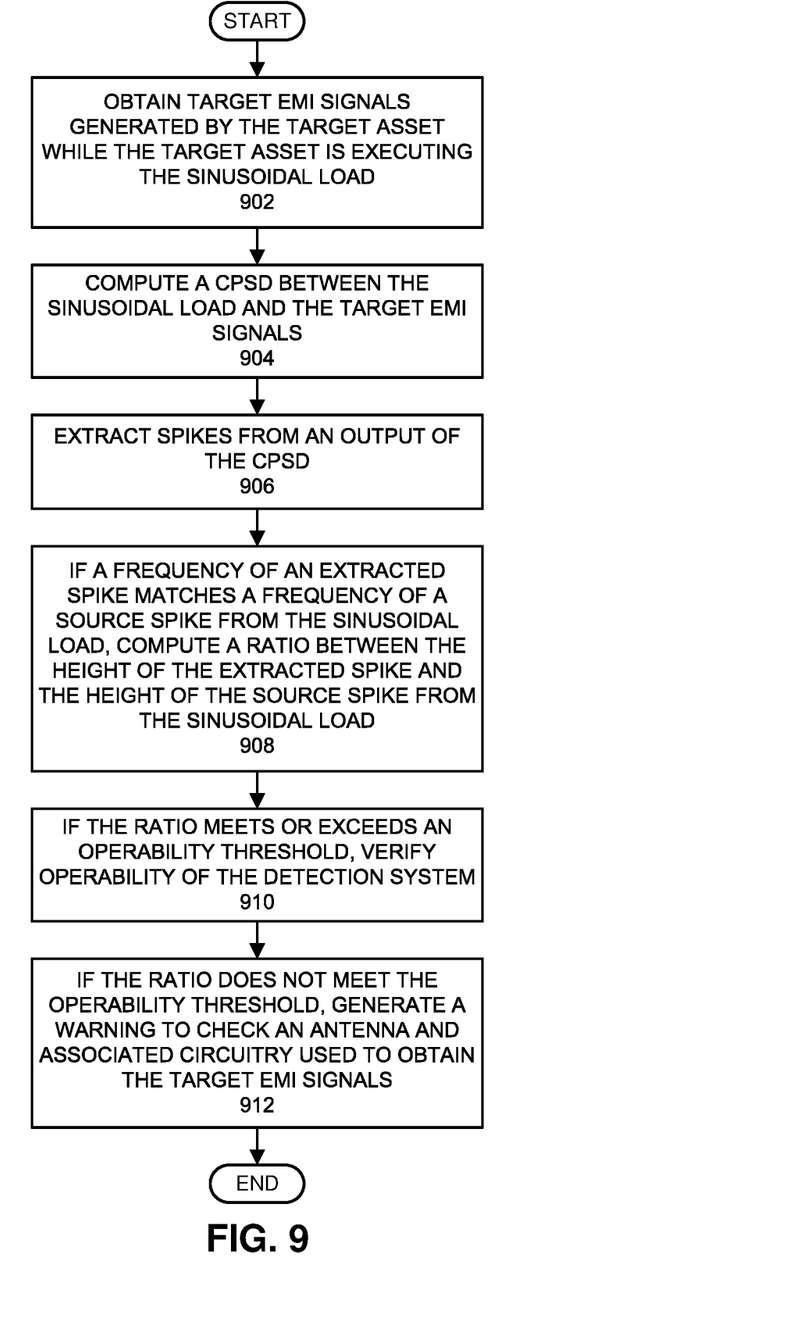
FIG. 9 presents a flow chart illustrating an operability testing process for an EMI fingerprint detection system in accordance with the disclosed embodiments.

FIG. 9 presents a flow chart illustrating an operability testing process for an EMI fingerprint detection system in accordance with the disclosed embodiments. During this process, the system first obtains target EMI signals generated by the target asset while the target asset is executing the sinusoidal load (step 902). Next, the system computes a CPSD between the sinusoidal load and the target EMI signals (step 904). The system then extracts spikes from an output of the CPSD (step 906). If a frequency of an extracted spike matches a frequency of a source spike from the sinusoidal load, the system computes a ratio between the height of the extracted spike and the height of the source spike from the sinusoidal load (step 908). If the ratio exceeds an operability threshold, the system verifies its own operability (step 910). If the ratio does not meet the operability threshold, the system generates a warning to check an antenna and associated circuitry used to obtain the target EMI signals (step 312).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting unwanted electronic components in a target asset, comprising:
   generating a sinusoidal load for the target asset;
   obtaining target electromagnetic interference (EMI) signals by monitoring EMI signals generated by the target asset while the target asset is executing the sinusoidal load;
   generating a target EMI fingerprint from the target EMI signals; and
   comparing the target EMI fingerprint against a reference EMI fingerprint for the target asset to determine whether the target asset contains unwanted electronic components.

2. The method of claim 1, wherein the method further comprises verifying operability for a detection system that performs the method by:
   obtaining target EMI signals generated by the target asset while the target asset is executing the sinusoidal load;
   computing a cross power spectral density (CPSD) between the sinusoidal load and the target EMI signals;
   extracting spikes from an output of the CPSD;
   when a frequency of an extracted spike matches a frequency of a source spike from the sinusoidal load, computing a ratio between the height of the extracted spike and the height of the source spike from the sinusoidal load;
   when the ratio meets or exceeds an operability threshold, verifying operability for the detection system; and when the ratio does not meet the operability threshold, generating a warning to check an antenna and associated circuitry used to obtain the target EMI signals.

3. The method of claim 1, wherein generating the sinusoidal load comprises using a pulse-width-modulation technique that sinusoidally modulates a duty cycle of a load, which cycles between an on-state and an off-state, to generate the sinusoidal load.

4. The method of claim 1, wherein generating the target EMI fingerprint from the target EMI signals involves:
performing a target Fast Fourier Transform (FFT) operation on the target EMI signals to transform the target EMI signals from a time-domain representation to a frequency-domain representation;
partitioning an output of the target FFT operation into a set of frequency bins;
constructing a target amplitude time-series signal for each of the frequency bins in the set of frequency bins;
selecting a subset of frequency bins that are associated with the highest average correlation coefficients; and
generating the target EMI fingerprint by combining target amplitude time-series signals for each of the selected subset of frequency bins.

5. The method of claim 4, wherein selecting the subset of frequency bins involves:
computing cross-correlations between pairs of amplitude time-series signals associated with pairs of the set of frequency bins;
computing an average correlation coefficient for each of the frequency bins; and
selecting a subset of frequency bins that are associated with the highest average correlation coefficients.

6. The method of claim 1, wherein prior to obtaining the target EMI signals, the method further comprises generating the reference EMI fingerprint by:
obtaining reference EMI signals, which are generated by a reference asset of the same type as the target asset while the reference asset is executing the sinusoidal load, wherein the reference asset is certified not to contain unwanted electronic components; and
generating the reference EMI fingerprint from the reference EMI signals.

7. The method of claim 6, wherein the method further comprises training a multivariate state estimation technique (MSET) model using the reference amplitude time-series signals for the reference EMI fingerprint.

8. The method of claim 7, wherein comparing the target EMI fingerprint against the reference EMI fingerprint involves:
feeding the target amplitude time-series signals into the trained MSET model to produce estimated values for the target amplitude time-series signals;
performing pairwise-differencing operations between actual values and the estimated values for the amplitude time-series signals to produce residuals;
performing a sequential probability ratio test (SPRT) on the residuals to produce SPRT alarms; and
determining from the SPRT alarms whether the target asset contains any unwanted electronic components.

9. A non-transitory, computer-readable storage medium storing instructions that when executed by a computer cause the computer to perform a method for detecting unwanted electronic components in a target asset, the method comprising:
generating a sinusoidal load for the target asset;
obtaining target EMI signals by monitoring EMI signals generated by the target asset while the target asset is executing the sinusoidal load;
generating a target EMI fingerprint from the target EMI signals; and
comparing the target EMI fingerprint against a reference EMI fingerprint for the target asset to determine whether the target asset contains unwanted electronic components.

10. The non-transitory, computer-readable storage medium of claim 9, wherein the method further comprises verifying operability for a detection system that performs the method by:
obtaining target EMI signals generated by the target asset while the target asset is executing the sinusoidal load;
computing a CPSD between the sinusoidal load and the target EMI signals;
extracting spikes from an output of the CPSD;
when a frequency of an extracted spike matches a frequency of a source spike from the sinusoidal load, computing a ratio between the height of the extracted spike and the height of the source spike from the sinusoidal load;
when the ratio exceeds an operability threshold, verifying operability for the detection system; and
when the ratio does not meet the operability threshold, generating a warning to check an antenna and associated circuitry used to obtain the target EMI signals.

11. The non-transitory, computer-readable storage medium of claim 9, wherein generating the sinusoidal load comprises using a pulse-width-modulation technique that sinusoidally modulates a duty cycle of a load, which cycles between an on-state and an off-state, to generate the sinusoidal load.

12. The non-transitory, computer-readable storage medium of claim 9, wherein generating the target EMI fingerprint from the target EMI signals involves:
performing a target FFT operation on the target EMI signals to transform the target EMI signals from a time-domain representation to a frequency-domain representation;
partitioning an output of the target FFT operation into a set of frequency bins;
constructing a target amplitude time-series signal for each of the frequency bins in the set of frequency bins;
selecting a subset of frequency bins that are associated with the highest average correlation coefficients; and
generating the target EMI fingerprint by combining target amplitude time-series signals for each of the selected subset of frequency bins.

13. The non-transitory, computer-readable storage medium of claim 9, wherein prior to obtaining the target EMI signals, the method further comprises generating the reference EMI fingerprint by:
obtaining reference EMI signals, which are generated by a reference asset of the same type as the target asset while the reference asset is executing the sinusoidal load, wherein the reference asset is certified not to contain unwanted electronic components; and
generating the reference EMI fingerprint from the reference EMI signals.

14. The non-transitory, computer-readable storage medium of claim 13, wherein the method further comprises training an MSET model using the reference amplitude time-series signals for the reference EMI fingerprint.

15. The non-transitory, computer-readable storage medium of claim 14, wherein comparing the target EMI fingerprint against the reference EMI fingerprint involves:
- feeding the target amplitude time-series signals into the trained MSET model to produce estimated values for the target amplitude time-series signals;
- performing pairwise-differencing operations between actual values and the estimated values for the amplitude time-series signals to produce residuals;
- performing a SPRT on the residuals to produce SPRT alarms; and
- determining from the SPRT alarms whether the target asset contains any unwanted electronic components.

16. A system that detects unwanted electronic components in a target asset, comprising:
- at least one processor and at least one associated memory; and
- a detection mechanism that executes on the at least one processor, wherein the detection mechanism:
  - generates a sinusoidal load for the target asset;
  - obtains target EMI signals by monitoring EMI signals generated by the target asset while the target asset is executing the sinusoidal load;
  - generates a target EMI fingerprint from the target EMI signals; and
  - compares the target EMI fingerprint against a reference EMI fingerprint for the target asset to determine whether the target asset contains unwanted electronic components.

17. The system of claim 16, further comprising an operability verification mechanism, which verifies operability of the detection mechanism, wherein during operation, the operability verification mechanism:
- obtains target EMI signals generated by the target asset while the target asset is executing the sinusoidal load;
- computes a CPSD between the sinusoidal load and the target EMI signals;
- extracts spikes from an output of the CPSD;
- when a frequency of an extracted spike matches a frequency of a source spike from the sinusoidal load, computes a ratio between the height of the extracted spike and the height of the source spike from the sinusoidal load;
- when the ratio meets or exceeds an operability threshold, verifies operability for the detection system; and
- when the ratio does not meet the operability threshold, generates a warning to check an antenna and associated circuitry used to obtain the target EMI signals.

18. The system of claim 16, wherein while generating the sinusoidal load, the detection mechanism uses a pulse-width-modulation technique that sinusoidally modulates a duty cycle of a load, which cycles between an on-state and an off-state, to generate the sinusoidal load.

19. The system of claim 16, wherein while generating the target EMI fingerprint from the target EMI signals, the detection mechanism:
- performs a target FFT operation on the target EMI signals to transform the target EMI signals from a time-domain representation to a frequency-domain representation;
- partitions an output of the target FFT operation into a set of frequency bins;
- constructs a target amplitude time-series signal for each of the frequency bins in the set of frequency bins;
- selects a subset of frequency bins that are associated with the highest average correlation coefficients; and
- generates the target EMI fingerprint by combining target amplitude time-series signals for each of the selected subset of frequency bins.

20. The system of claim 16, wherein prior to obtaining the target EMI signals, the detection mechanism generates the reference EMI fingerprint, wherein while generating the reference EMI fingerprint, the detection mechanism:
- obtains reference EMI signals, which are generated by a reference asset of the same type as the target asset while the reference asset is executing the sinusoidal load, wherein the reference asset is certified not to contain unwanted electronic components; and
- generates the reference EMI fingerprint from the reference EMI signals.

\* \* \* \* \*